United States Patent [19]

Sleger

[11] 4,079,300

[45] Mar. 14, 1978

[54] TAPE DECK

[75] Inventor: Roger R. Sleger, Redwood City, Calif.

[73] Assignee: Ampex Corporation, Redwood City, Calif.

[21] Appl. No.: 682,850

[22] Filed: May 3, 1976

[51] Int. Cl.² .............................................. H02P 5/16
[52] U.S. Cl. ..................................... 318/326; 360/73
[58] Field of Search ................... 318/6, 313, 327, 326; 324/175; 360/73, 80, 84; 310/DIG. 6, 268

[56] References Cited

U.S. PATENT DOCUMENTS

| 3,005,582 | 10/1961 | Brede | 360/73 |
|---|---|---|---|
| 3,168,664 | 2/1965 | Bost | 310/268 |
| 3,179,831 | 4/1965 | Moressee et al. | 310/268 |
| 3,890,641 | 6/1975 | Mo et al. | 360/84 |
| 3,978,521 | 8/1976 | Langer et al. | 360/73 |

Primary Examiner—David Smith, Jr.
Attorney, Agent, or Firm—Charles M. Carman, Jr.

[57] ABSTRACT

A tape drive that includes a capstan and tachometer mounted on the same shaft with a printed circuit motor. The capstan and tachometer are mounted to be accurately concentric with one another and the tachometer is sensed at the same angular position as the point of tangential engagement of tape and capstan and at the same radius, and controls the peripheral velocity of the capstan there so that even though the capstan may be eccentric relative to the true motor turning center, the tape speed is constant. The armature disc of the motor is accurately mounted in a plane normal to the shaft, and upon a cushioning element, to reduce brush contact errors.

12 Claims, 2 Drawing Figures

U.S. Patent  March 14, 1978  4,079,300
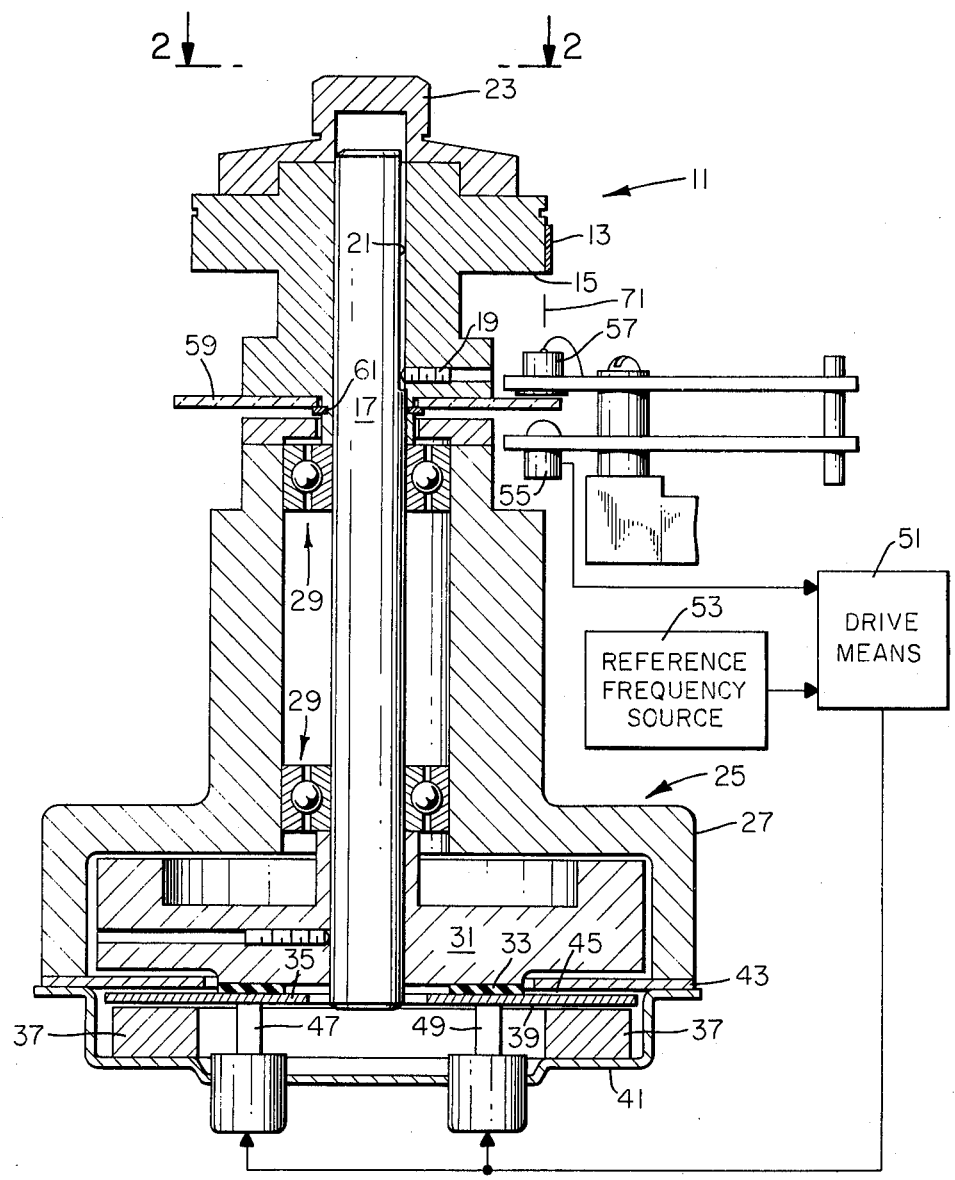
FIG_1
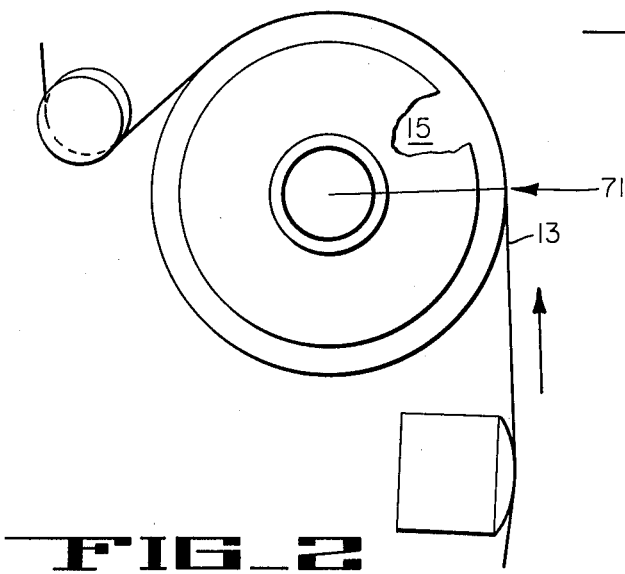
FIG_2

TAPE DECK

BACKGROUND OF THE INVENTION

This invention relates to tape driving apparatus, and particularly to motor and capstan drives therefor.

In the magnetic tape art, it is usual to employ a motor driven capstan to drive the tape at constant speed past the record and/or reproduce heads located in the tape path to one side of the capstan. A tachometer may be mounted on the capstan shaft to sense incipient variations in the drive speed and to provide information to the driving electronics to correct them by controlling the motor. To avoid "run out" or once-around peripheral velocity variations such as may be caused by any slight eccentricity in the bearings of the shaft, it is usual to mount the roughly finished shaft in precision bearings and to subsequently grind the shaft end as a capstan while the shaft is mounted in the bearings. Both the precision bearings and the mounting process are expensive, and the capstan cannot be replaced in the field without replacing the entire capstan-bearing and motor assembly. Also, the process is not suitable for mounting the usual glass tachometer disc, and any eccentricity in the tachometer mounting can still produce objectionable tape speed errors.

Another problem relates to the mounting of the printed circuit armature disc in the motor. If the disc flexes or is not accurately mounted in a normal plane to the shaft in the zone of brush contact, then poor contact results, together with audible noise and wear and other problems. It has been known in the art to mount the disc upon a solid backing element in the zone of brush contact, but this is not enough to solve all of the problems.

Accordingly, it is an object of the present invention to provide a tape drive in which inexpensive "non-precision" bearings can be used without grinding the capstan after assembly, and without having eccentricity-caused tape speed variations.

It is another object of the invention to provide a printed circuit motor with improved contact between rotor and brushes.

BRIEF DESCRIPTION OF THE INVENTION

These and other objects are accomplished in a tape drive that includes a capstan and tachometer mounted on the same shaft with a printed circuit motor. The capstan and tachometer are mounted upon the shaft to rotate therewith. The shaft, capstan and tachometer may be mounted concentric with one another, with their respective centers offset with respect to each other, or with the centers of the capstan and tachometer concentric and together offset with respect to the geometric center of the shaft. The tachometer is mounted upon the shaft with its indicia passing through a sensing point located a distance from the geometric center of the shaft that is equal to the radius of the capstan. If the shaft, capstan and tachometer are concentric with one another, the tachometer indicia are sensed at the same angular position at the point of tangential engagement of the tape and capstan. If the capstan is to maintain constant tape velocity along the tape path on the side of the capstan at which the tape enters engagement with the capstan, the tachometer indicia are sensed at the point at which the tape enters with the capstan. The tachometer indicia are sensed at the tangential engagement point at which the tape leaves the capstan if the tape velocity is to be maintained constant along the tape path on the other side of the capstan. If the capstan and tachometer are concentric but offset from the geometric center of the shaft, the tachometer indicia are sensed at a location along a line extending from the geometric center of the shaft that is perpendicular to a line extending tangentially with respect to the capstan surface at the tangential engagement point of the tape and capstan. If the capstan and tachometer centers are equally offset relative to shaft center, the tachometer indicia are sensed at a location along a line angularly displaced from a line extending from the geometric center of the shaft that is perpendicular to a tangent line at the tangential engagement point of the tape and capstan. The direction of the angular displacement is the same as the angular displacement of the centers of the capstan and tachometer relative to the geometric center of the shaft.

In a particular convenient embodiment of the invention, the capstan and tachometer are mounted to be accurately concentric with one another and the tachometer indicia are sensed at the same angular position as the point of tangential engagement of tape and capstan and at the same radius. By locating tachometer indicia sensing means to sense the indicia at the aforedescribed sensing point and using the time related information provided by the sensed indicia to control the capstan drive, the peripheral velocity of the capstan can be accurately controlled so that even though the capstan surface may be eccentrically mounted in the motor bearings, the tape speed is maintained constant. The armature disc of the motor is accurately mounted in a plane normal to the shaft, and upon a cushioning element, to reduce brush contact errors.

DESCRIPTION OF THE DRAWINGS

FIG. 1 is a cross-sectional elevational view of a tape drive according to the invention;

FIG. 2 is a plan view of a portion of the apparatus of FIG. 1.

DESCRIPTION OF THE PREFERRED EMBODIMENTS

Referring to FIG. 1, a drive 11 for a tape 13 is shown, the drive includes a capstan 15, mounted on a shaft 17 by means of set screws 19 fitting into a keyway 21 of the shaft. A knob element 23 is set screwed over the top of the capstan, and may be used to turn the capstan by hand, as for indexing during editing of the tape.

For driving the capstan in rotation, there is provided a motor 25 enclosed within a housing 27, the shaft 17 being employed also as the shaft of the motor and being mounted within the housing 27 by means of ball bearings 29. Upon the shaft 17 is set screwed to a flywheel 31, to which is cemented a washer 33 and a printed circuit armature disc 35. Motor magnets 37 are mounted adjacent the lower face portion 39 of the armature near the outer periphery thereof, as by means of an end cap element 41; and a magnetic return plate 43 is mounted adjacent the upper face portion 45 of the armature near the outer periphery thereof, and in contact with cap 41. The cap element 41 also serves to mount the brushes 47, 49, which engage the lower face portion 39 of the armature disc near the inner periphery thereof. Energizing current for the motor is supplied from a drive means 51, which is controlled by a reference frequency source 53, as well known in the art, so as to drive the motor at a constant rotational velocity in the absence of an error correction signal from a photocell means 55 which is positioned to read variations in a light beam from a light source 57 through a graduated glass tachometer disc 59 attached to the capstan. Thus, once-around variations in the peripheral speed of the disc are corrected.

In the structure shown, invention lies in the following features:

First, the tachometer disc 59 is mounted to be precisely concentric with the capstan 15. This can be done during the manufacturing process by mounting the capstan upside-down and by cementing the glass disc 59 to the bottom (now upper) face thereof with slow-setting cement, and then by trial and error, measuring and correcting the concentricity of the capstan and tachometer disc until the concentricity error is reduced to a desired negligible value, while the cement is still setting. Once the cement has hardened, the axial position of the tachometer disc is secured as by snapping into place a close-fitting split ring retainer 61.

Second, the light source 57 and photocell 55 are positioned to read the indicia on the tachometer disc 59 at the same angular position as that of the tangent point of the tape 13 first engaging the capstan 15 at the same radius.

Thus, in effect, when the capstan 15 is eccentrically mounted, the motor speeds up and slows down again once in each revolution, while the peripheral speed of the capstan at tape 13 remains substantially absolutely constant.

The tape 13 may engage the capstan at only one peripheral point thereof, in which case it is usual to pinch the tape against the capstan by means of a pinch roller, not here shown, to give the capstan sufficient frictional traction to drive the tape. Alternatively, the capstan may have a roughened surface, and the tape may be tensioned around the capstan for a substantial angle of wrap, as by means well known in the art. In either case, it is advantageous to the invention to position the light source 57 and photocell 55 at the precise point 71 (as shown in the plan view of FIG. 2) where the tape coming downstream from the transducing heads 72, first tangentially engages the capstan 15.

It will be seen that with the above structure and arrangement, it becomes possible to use inexpensive bearings, to mount the shaft in the bearings at any desired stage during the manufacturing process, to replace the bearings or the shaft in the field subsequent to manufacture, and to avoid the need for machining the capstan surface anew after having mounted the shaft permanently in expensive precision bearings.

Turning now to the motor, it will be shown how the best possible contact between the brushes 47, 49 and commutator bars of the armature 35 is ensured. The tendency of the thin disc 35 to flex under load is countered by mounting the disc on the flywheel 31 so that the inner peripheral portion of the disc, engaged by the brushes, is solidly backed by the flywheel, as shown. Also, the washer 33 is of novel construction. The washer serves as a bonding element between the flywheel and disc 35, also as an aligning element, and further as a vibration absorbing pad.

The washer may be manufactured from at least two preferred materials: it may be cut from thick felt material, or from open-cell foamed plastic material. It is then soaked in liquid epoxy cement so as to be entirely impregnated therewith. Then the disc 35 is laid upon a flat gauge plate and is centered about an upstanding arbor that extends upwardly, accurately normal to the gauge plate, and that has precisely the diameter of the inside of the flywheel hub opening. The washer 35 is then taken from its epoxy bath and laid upon the disc 35, concentrically with the arbor of the gauge plate. The flywheel 31 is then forced upon the washer 35, and the epoxy is allowed to harden, cementing the flywheel, washer and disc 35 into a unitary construction. The gauge plate with its upstanding arbor ensures that the face 39 of the disc 35 will lie accurately in a plane normal to the flywheel axis when the epoxy has hardened. If desired, the face 39 of the disc 35 can then be lapped to ensure planar smoothness of all parts thereof. This accuracy in forming the assembly ensures the best possible operating contact between brushes 47, 49 and disc 35 and lessens wear, damaging sparking and audible brush noise. Noise is also reduced through the vibration damping action of the washer 33.

Thus there has been described a tape drive that includes a capstan and tachometer mounted on the same shaft with a printed circuit motor. The capstan and tachometer are mounted to be accurately concentric with one another and the tachometer is sensed at the same angular position as the point of tangential engagement of tape and capstan and at the same radius, and controls the peripheral velocity of the capstan there so that even though the capstan surface may be eccentrically mounted to true turning center, the tape speed is constant. The armature disc of the motor is accurately mounted in a plane normal to the shaft, and upon a cushioning element, to reduce brush contact errors.

I claim:

1. A capstan tape and drive assembly, comprising:
   a motor and drive means therefor coupled to said capstan;
   means for sensing the speed of said tape at a predetermined point on the path of said tape around said capstan;
   said predetermined point being the point at which the tape first engages said capstan in movement thereabout;
   said assembly being provided with indicia having predetermined spacings in movement past said point so as to be indicative of the instantaneous peripheral speed of said capstan at said point; and
   said sensing means being coupled to said motor drive means for controlling the speed of said tape.

2. The combination recited in claim 1 wherein the indicia are formed upon a tachometer disc that is mounted upon said assembly with said indicia precisely concentric with the driving surface of the capstan.

3. The combination recited in claim 2, wherein said speed sensing means comprises tachometer sensing means mounted for sensing said indicia of said tachometer disc at said predetermined point and at the same radius as said driving surface of said capstan at said point.

4. The combination recited in claim 3, wherein said motor has a rotor and a shaft therefor upon which said capstan is mounted, said tachometer disc being mounted directly upon said capstan.

5. The combination recited in claim 4, wherein:
   said motor is a printed circuit motor comprising a flywheel and a printed circuit armature disc mounted thereon, and brushes engaging said armature disc opposite said flywheel so that said armature disc is firmly supported in the zone of engagement of said brushes; and
   a vibration damping pad member is interposed between said flywheel and said armature disc in the zone of engagement of said armature disc and brushes.

6. The combination recited in claim 1 wherein the capstan has a radius, drive means coupled to said capstan has a geometric center, the drive assembly provides indicia which are a distance from the geometric center equal to radius of the capstan along a first line angularly related to a second line extending from the geometric center to a third line tangent to the point on the path of said tape around said capstan.

7. The combination recited in claim 1 wherein said point is located at the tangential engagement of the tape with the capstan as it enters the path around said capstan.

8. As a subcombination, a printed circuit motor comprising a stator, wherein:
 a flywheel and a printed circuit armature disc mounted thereon, and brushes engaging said armature disc opposite said flywheel so that said armature disc is firmly supported in the zone of engagement of said brushes; and
 a vibration damping pad member interposed between said flywheel and said armature disc in the zone of engagement of said armature disc and brushes.

9. The subcombination recited in claim 8, wherein said pad member is formed of felt material impregnated with epoxy cement.

10. The subcombination recited in claim 8, wherein said pad member is formed of open-cell foamed plastic material impregnated with epoxy cement.

11. Apparatus for sensing the velocity of a tape member segment extending tangentially from a point of tangency with a cylinder member rotating about an actual rotation center thereof, wherein:
 at least one of said members is provided with indicia having a predetermined angular spacing about an indicia center when said tape is wrapped around said cylinder beginning at said tangent point;
 means are provided for sensing the velocity of said indicia at a predetermined sensing point; and
 the angular location of said sensing point with respect to said actual rotation center is the angular location at which the radius from said sensing point to said indicia center, plus the radius from said tangent point to said actual rotation center, have an arithmetic sum with the least possible variation during once-around rotation of said cylinder.

12. The combination recited in claim 11, wherein said angular location of the sensing point is the mean angular location of the tangent point with respect to the actual rotation point.

* * * * *